US011600274B2

(12) United States Patent
Stefanski et al.

(10) Patent No.: US 11,600,274 B2
(45) Date of Patent: Mar. 7, 2023

(54) METHOD FOR GATHERING INFORMATION DISTRIBUTED AMONG FIRST RESPONDERS

(71) Applicant: MOTOROLA SOLUTIONS, INC., Chicago, IL (US)

(72) Inventors: Mariusz Stefanski, Wloszczowa (PL); Kornel Maslowski, Bytom (PL); Dariusz Majcherczyk, Plaza (PL); Grzegorz Gustof, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 368 days.

(21) Appl. No.: 16/977,919

(22) PCT Filed: May 9, 2018

(86) PCT No.: PCT/PL2018/050018
§ 371 (c)(1),
(2) Date: Sep. 3, 2020

(87) PCT Pub. No.: WO2019/216779
PCT Pub. Date: Nov. 14, 2019

(65) Prior Publication Data
US 2021/0074288 A1    Mar. 11, 2021

(51) Int. Cl.
*H04L 67/63* (2022.01)
*G10L 15/08* (2006.01)
(Continued)

(52) U.S. Cl.
CPC .............. *G10L 15/22* (2013.01); *G06F 16/63* (2019.01); *G10L 15/1815* (2013.01);
(Continued)

(58) Field of Classification Search
USPC ........................ 704/1–275; 725/9–18, 73–82
See application file for complete search history.

(56) References Cited

U.S. PATENT DOCUMENTS

| 5,603,021 A | 2/1997 | Spencer et al. |
| 7,617,203 B2 | 11/2009 | Awadallah et al. |

(Continued)

OTHER PUBLICATIONS

Donny Jackson: "Motorola Solutions: Virtual Intelligence Partner prototype lets officers talk to databases", Apr. 30, 2015 (Apr. 30, 2015), XP054978635, Retrieved from the Internet: URL:http://urgentcomm.com/motorola-solutions/motorola-solutions-virtual-intelligence-partner-prototype-lets-officers-talk-data [retrieved on Aug. 27, 2018], all pages.

(Continued)

*Primary Examiner* — Marcellus J Augustin
(74) *Attorney, Agent, or Firm* — Daniel R. Bestor

(57) ABSTRACT

A process for recognizing and responding to a detected audio inquiry by gathering information distributed amongst users and providing a calculated result includes monitoring audio communications and detecting an audio inquiry from a first electronic communication device. It is determined then the audio inquiry is of a distributed information gathering and mathematical operation type and, in response, a plurality of target electronic communication devices that are capable of providing partial answers to the audio inquiry are identified and a request for a partial answer transmitted to each. Corresponding partial answers are received and a mathematical operation performed on the partial answers to generate a final answer to the audio inquiry different from the corresponding partial answers. The final answer is then provided to the first electronic communication device.

20 Claims, 4 Drawing Sheets

(51) Int. Cl.
*G10L 15/20* (2006.01)
*G06F 16/60* (2019.01)
*G06F 16/638* (2019.01)
*G10L 15/22* (2006.01)
*G06F 16/63* (2019.01)
*G10L 15/18* (2013.01)
*H04L 67/12* (2022.01)

(52) U.S. Cl.
CPC .......... *G10L 15/1822* (2013.01); *H04L 67/12* (2013.01); *G10L 2015/088* (2013.01)

(56) References Cited

U.S. PATENT DOCUMENTS

| | | | |
|---|---|---|---|
| 8,386,469 B2 | 2/2013 | Reuther et al. | |
| 8,392,394 B1 | 3/2013 | Kumar et al. | |
| 9,031,222 B2* | 5/2015 | Wolfeld | H04M 3/5175 |
| | | | 379/265.06 |
| 9,471,647 B2 | 10/2016 | Bent et al. | |
| 10,240,936 B1* | 3/2019 | Md Saad | G08G 1/202 |
| 10,271,196 B1* | 4/2019 | Yanamandra | H04M 1/00 |
| 10,276,031 B1* | 4/2019 | Ho | G10L 25/63 |
| 2007/0116189 A1* | 5/2007 | Clawson | H04M 11/04 |
| | | | 379/37 |
| 2012/0115494 A1* | 5/2012 | Christensen | H04W 76/50 |
| | | | 455/450 |
| 2013/0007023 A1 | 1/2013 | Davis et al. | |
| 2017/0116289 A1* | 4/2017 | Deshmukh | G06F 16/2471 |
| 2018/0032576 A1* | 2/2018 | Romero | G06F 21/31 |
| 2018/0089278 A1 | 3/2018 | Bhattacharjee et al. | |
| 2018/0198865 A1* | 7/2018 | Kurihara | H04W 88/02 |
| 2021/0323446 A1* | 10/2021 | Christensen | B60N 2/42736 |

OTHER PUBLICATIONS

The International Search Report and the Written Opinion corresponding patent serial No. PCT/PL2018/050018 filed May 9, 2018, all pages.

* cited by examiner

METHOD FOR GATHERING INFORMATION DISTRIBUTED AMONG FIRST RESPONDERS

This application is a National Stage filing under 35 USC § 371 of co-pending Patent Cooperation Treaty international application having Serial No. PCT/PL18/50018 (the 'PCT international application') filed on May 9, 2018. This application claims priority to the PCT international application, the entire contents of which are incorporated herein by reference.

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
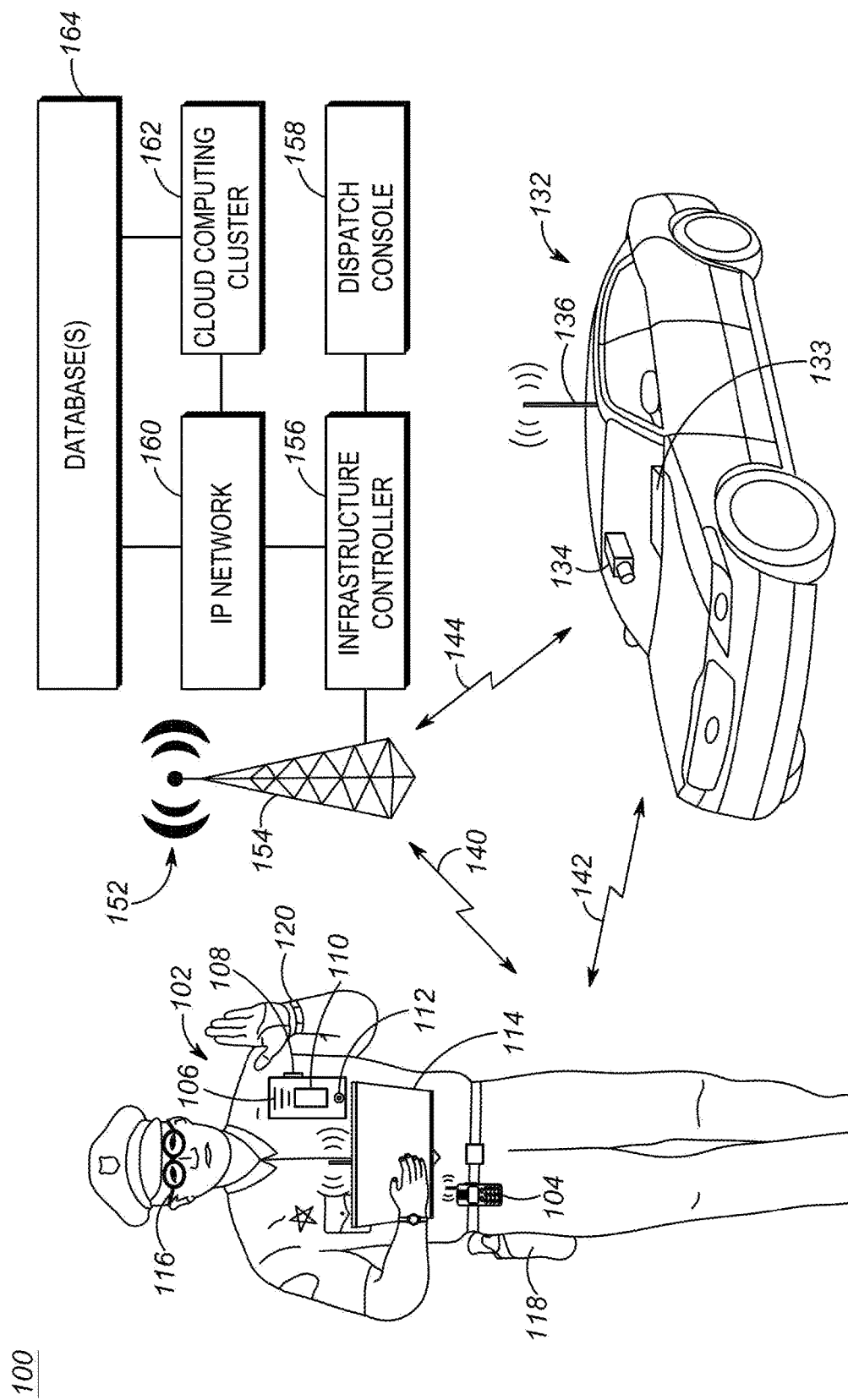
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public safety communication systems, communication devices are often affiliated to different communication groups (also referred to as talk groups or talkgroups) to perform group communication. Group communication functionality allows a communication device (also referred to as a talk group member) to simultaneously communicate with multiple other devices that are associated with the same communication group. This avoids the need for communication devices to repeat the same message or establish different communication sessions to communicate the same message to other devices. In communication devices such as land mobile radios, a push to talk (PTT) interface is implemented to allow a user of the radio to press the push to talk interface to transmit audio on one or more communication channels (also referred to as a talk group channel) for reception by multiple users associated with the talk group.

In public safety environments, there may be situations in which particular members in the talk group are scattered across a wide geographic range. In other situations, particular members in the talk group may be scattered across a more narrow and perhaps overlapping geographic range or ranges.

While an ability to communicate to single targets or to multiple members of a group simultaneously across a variety of different situations and distances can be beneficial, it can also create some problems when attempting to gather and synthesize real-time (i.e., current and up-to-date) information by an electronic digital assistant that is accurate and useful to the requesting device and/or other members of a group, and perhaps to others outside of the group as well, such as to a dispatcher. Furthermore, and outside of the talkgroup context, while conventional electronic digital assistants are generally adept at identifying audio queries and retrieving, via a database, information responsive to that audio query, they have not been tasked with more complex operations in which information must be gathered in real-time across a variety of end-user/in-field communication devices and synthesized before providing an answer to the query back to the requestor (whether via a unicast data connection or private call or via a multi-cast or broadcast data connection or talkgroup call or otherwise).

Accordingly, what is needed is an improved system and method for an electronic digital assistant recognizing and responding to an audio inquiry by gathering information distributed amongst users in real-time and providing a calculated result by, for example, synthesizing the information to generate a calculated result that is different from the set of all information gathered from the users, and providing the result in accordance with some embodiments.

In accordance with one embodiment, a process for an electronic digital assistant recognizing and responding to a detected audio inquiry by gathering information distributed amongst users and providing a calculated result includes: monitoring, at an electronic computing device, audio communications; detecting, at the electronic computing device, from the audio communications, an audio inquiry from a first electronic communication device; determining, by the electronic computing device, that the audio inquiry is of a distributed information gathering and mathematical operation type and responsively: identifying, by the electronic computing device, a plurality of target electronic communication devices that are capable of providing partial answers to the audio inquiry; transmitting, by the electronic computing device, a request for a partial answer to each of the identified plurality of target electronic communication devices; receiving, by the electronic computing device, a plurality of corresponding partial answers from the plurality of target electronic communication devices; performing, by the electronic computing device, a mathematical operation on the plurality of partial answers to generate a final answer to the audio inquiry different from the plurality of corresponding partial answers; and providing, by the electronic computing device, the final answer to the first electronic communication device.

In accordance with another embodiment, an electronic computing device for an electronic digital assistant to recognize and respond to a detected audio inquiry by gathering information distributed amongst users and providing a calculated result, the electronic device comprising: an electronic processor; and a communication interface communicatively coupled to the electronic processor, wherein the electronic processor is configured to: monitor, via the communication interface, audio communications; detect, from the audio communications, an audio inquiry from a first electronic communication device; determine that the audio inquiry is of a distributed information gathering and mathematical operation type and responsively: identify a plurality of target electronic communication devices that are capable of providing partial answers to the audio inquiry; transmit, via the communication interface, a request for a partial answer to each of the identified plurality of target electronic communication devices; receive, via the communication interface, a plurality of corresponding partial answers from the plurality of target electronic communication devices; perform a mathematical operation on the plurality of partial answers to generate a final answer to the audio inquiry different from the plurality of corresponding partial answers; and provide, via the communications interface, the final answer to the first electronic communication device.

In accordance with a still further embodiment, a non-transient computer readable medium containing program instructions for causing a computer to perform a first set of functions comprising: monitor, via a communication interface, audio communications; detect, from the audio communications, an audio inquiry from a first electronic communication device; determine that the audio inquiry is of a distributed information gathering and mathematical operation type and responsively: identify a plurality of target electronic communication devices that are capable of providing partial answers to the audio inquiry; transmit, via the communication interface, a request for a partial answer to each of the identified plurality of target electronic communication devices; receive, via the communication interface, a plurality of corresponding partial answers from the plurality of target electronic communication devices; perform a mathematical operation on the plurality of partial answers to generate a final answer to the audio inquiry different from the plurality of corresponding partial answers; and provide, via the communications interface, the final answer to the first electronic communication device.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 2:
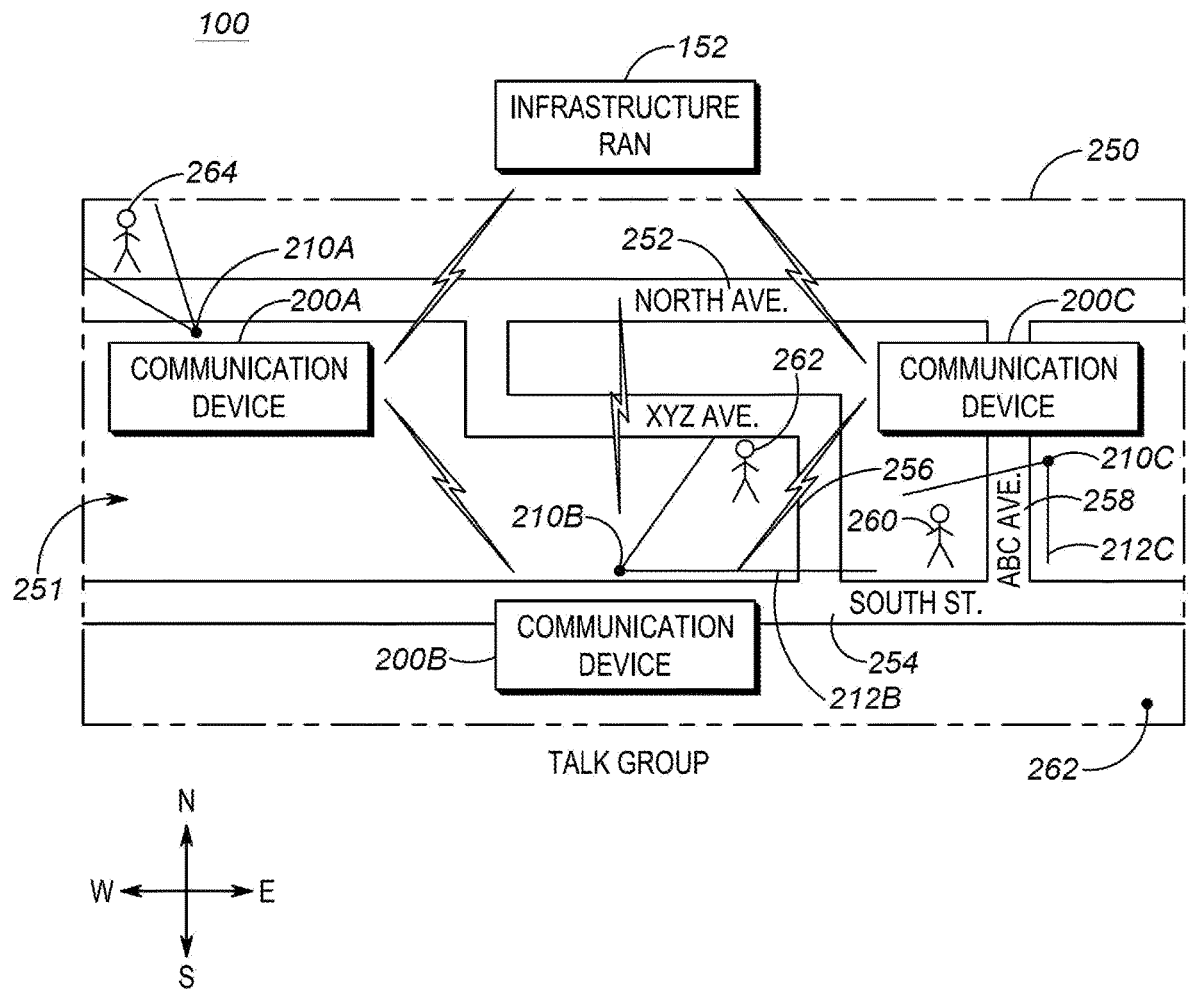
FIG. 2 is a system diagram illustrating a plurality of communication devices of FIG. 1 that may or may not be associated with a talk group and which may be located at varying locations, in accordance with some embodiments.

Referring now to the drawings, and in particular FIGS. 1 and 2, a communication system 100 is shown including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices as indicated by FIG. 2. The user 102 and other additional users may be 'in-field users', in that the user 102 is in the field (e.g., on the clock and performing some portion of his or her duties) in a professional context, and may have either a specifically assigned (and higher priority) current task (e.g., on-assignment) or may be performing a general (and lower priority) activity or set of default tasks when no specifically assigned task is available and currently assigned (e.g., not-on-assignment).

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices are configured to receive inputs associated with the user 102 and/or provide outputs to the user 102 in addition to communicating information to and from other communication devices and the infrastructure RAN 152.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, communication devices 200A, 200B, 200C shown in FIG. 2). Although FIG. 1 shows multiple communication devices associated with the user 102, in some embodiments, the communication system 100 includes communication devices of multiple users.

For example, as shown in FIG. 2, multiple communication devices 200A-200C may form a talk group 250 and may be variously dispersed across a geographic area 251.

The communication device 200A may be associated with a first user located at a first location 210A, the communication device 200B may be associated with a second user located at a second location 210B, and the communication device 200C may be associated with a third user located at a third location 210C. More specifically, and as illustrated in FIG. 2, communication device 200A may be located at a geographic location 210A on North Ave. 252, communication device 200B may be located at geographic location 210B on South St. 254, and communication device 200C may be located at geographic location 210C on ABC Ave 258. XYZ Ave. 256 connects North Ave. 252 with South St. 254. Locations 210A, 210B, and 210C may be defined by street or business addresses, longitude/latitude coordinates determined via a global navigation satellite system (GNSS) system such as the Global Positioning System (GPS), Cartesian or polar coordinates determined via a communication device performed triangulation process via known locations of base stations or other wireless transmitters, or by a network-determined location identified via a similar triangulation process across a plurality of known base station or other wireless access point locations.

Further, as shown in FIG. 2, the communication devices 200A, 200B, and 200C may be members of a same talk group i.e. talk group 250. Although not shown in FIG. 2, each of the communication devices 200A, 200B, 200C may also be associated with one or more talk groups other than the talk group 250 and/or may also participate in unicast data communications or private audio or multimedia calls outside of talk group 250. Additionally, each user in FIG. 2 is assumed to be equipped with a body camera such as an RSM video capture device 106 that has respective illustrated fields of view 212A, 212B, and 212C for the first, second, and third users. More specifically, the first user's body camera has a field of view 212A that incorporates a first captured user 260, the second user's body camera has a field of view 212B that incorporates both a second captured user 262 and third captured user 264, and the third user's body camera has a field of view 212C that incorporates the third captured user 264. The captured users 260, 262, 264 may be persons of interest and may be, for example, victims, suspects, citizens, witnesses, fire fighters, other police officers, or some other type or category of person.

In some embodiments, the communication devices 200A-200C communicate with each other over the infrastructure RAN 152 and/or communicate with each other directly as described herein. Similarly, other devices, such as the dispatch console 158, may communicate with communication devices 200A-200C of multiple users through the infrastructure RAN 152. In some embodiments, one or more users may have multiple associated communication devices, for example, as shown in FIG. 1. As shown in FIG. 2, the communication devices 200A, 200B, 200C may be dispersed across geographic area 251 supported by infrastructure RAN 152 and positioned at various distinct or overlapping locations that may vary over time within the geographic area 251.

Although FIG. 2 illustrates communication device 200A, 200B, and 200C located at various outdoor geographic locations, in other embodiments, indoor locationing may be used to identify relative locations within a building, including by room, floor, indoor coordinate, cardinal location, of some other combination of indoor locationing parameters.

Referring back to FIG. 1, the portable radio 104, in particular, may be any communication device 200 used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a universal serial bus (USB) port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or near field communication (NFC) transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch/interface or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture (such as a talk group 250 shown in FIG. 2) that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short-range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1 may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of communication devices. Such communication devices may be portable, mobile, or stationary and may include any one or more of the communication devices illustrated in FIG. 1, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a wireless local area network (WLAN) technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server (also referred to as a talk group server) that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including the dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 3, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

As shown in FIG. 1, database(s) 164 may be accessible via the IP network 160 and/or the cloud computing cluster 162. As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The database(s) may include databases such as a long-term video storage database, a historical or forecasted weather database, an offender database perhaps including facial recognition images to match against, a cartographic database of streets and elevations, a traffic database of historical or current traffic conditions, incident database including data such as incident assignment and timeline of incidents, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

b. Device Structure

Figure 3:
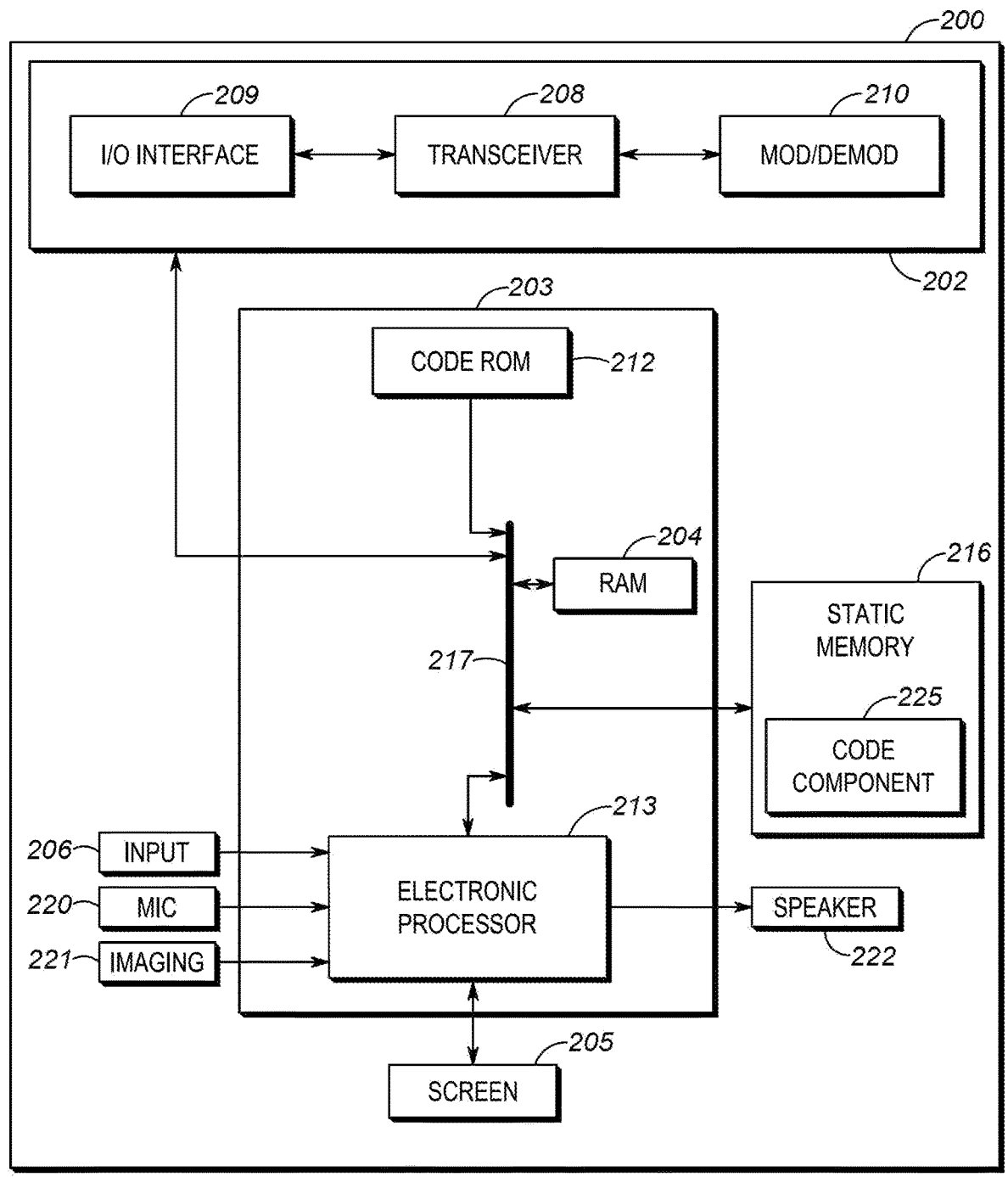
FIG. 3 is a device diagram showing a device structure of a communication device for use in the systems of FIGS. 1 and/or 2 in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 may represent the communication devices 200A-200C described above with respect to FIGS. 1 and 2, depending on the type of the communication device, the communication device 200 may include fewer or additional components in configurations different from that illustrated in FIG. 3. For example, in some embodiments, the communication device 200 acting as the infrastructure controller 156 of FIG. 1 may not include one or more of the screen 205, microphone 220, imaging device 221, and speaker 222. As another example, in some embodiments, the communication device 200 acting as the portable radio 104 of the RSM video capture device 106 of FIG. 1 may further include a location determination device (for example, a global positioning system (GPS) receiver) as explained above. Other combinations are possible as well.

As shown in FIG. 3, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 4 and the accompanying text. Static memory 216 may also store one or more mappings as described below in more detail with respect to FIG. 4. The static memory 216 may comprise, for example, a hard-disk drive (HDD), an optical disk drive such as a compact disk (CD) drive or digital versatile disk (DVD) drive, a solid-state drive (SSD), a tape drive, a flash memory drive, or a tape drive, and the like.

2. Processes for an Electronic Digital Assistant to Recognize and Respond to an Audio Inquiry by Gathering Information Distributed Amongst Users and Providing a Calculated Result In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102 may, for example, provide an audio inquiry that is received by the microphone 220 of the communication device 200. In accordance with some embodiments, the audio inquiry received at the microphone is further transmitted as audio communications on a talk group channel for receipt by other users in a talk group or on a private channel for receipt by one other user. The electronic computing device receives signals representative of the audio inquiry (directly from the microphone 220 or through monitoring audio communications on the talk group channel or private channel) and analyzes the signals to determine the intent and/or content of the audio inquiry. For example, the electronic computing device may include a natural language processing (NLP) engine configured to determine the intent and/or content of the audio inquiry. The electronic computing device may also be configured to determine a response to the audio inquiry (for example, in accordance with a process 400 illustrated in FIG. 4) and provide the response to an output device of the communication device 200 (for example, one or more of the speaker 222 via a generated audio response and the screen 205 via a generated text, graphic, and/or video-based response). In other words, one or more of the communication device 200, embodied in one or more of the communication devices of FIG. 1, such as the portable radio 104, the infrastructure controller 156, the dispatch console 158, and/or cloud computing cluster 162 may include a natural language processing engine to analyze audio inquiries received from the communication device 200 and provide responses to the audio inquiries in the form of audio data, image data, and/or text data.

Although an audio inquiry is described above, in some embodiments, the electronic computing device receives and responds to other types of queries and inputs. For example, the user 102 may submit a text inquiry to the electronic computing device by typing the text inquiry into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video.

In accordance with some embodiments, the electronic digital assistant is also added to a talk group (for example, talk group 250) as a talk group member to monitor communications (as well as transmit communications) between communication devices 200A-200C that are members of the communications group. When the electronic computing device implementing the electronic digital assistant detects an audio inquiry, for example, a voice inquiry transmitted on a talk group channel by a particular talk group member, the electronic computing device implementing the electronic digital assistant processes the audio inquiry and responds to the audio inquiry in accordance with process 400 illustrated in FIG. 4. The audio inquiry may be a specific inquiry transmitted on the talk group channel with the intent that the electronic digital assistant would hear the inquiry and respond (e.g., a spoken instruction to the electronic digital assistant to perform a particular function or retrieve particular information), or may be an inquiry or statement made from a first user to one or more other users where the electronic digital assistant determines it can extract a useful inquiry from the first user's inquiry or statement and proactively provide additional information, context, or background to the communication group and/or individual or sub-group of users in the communication group in accordance with this disclosure.

Figure 4:
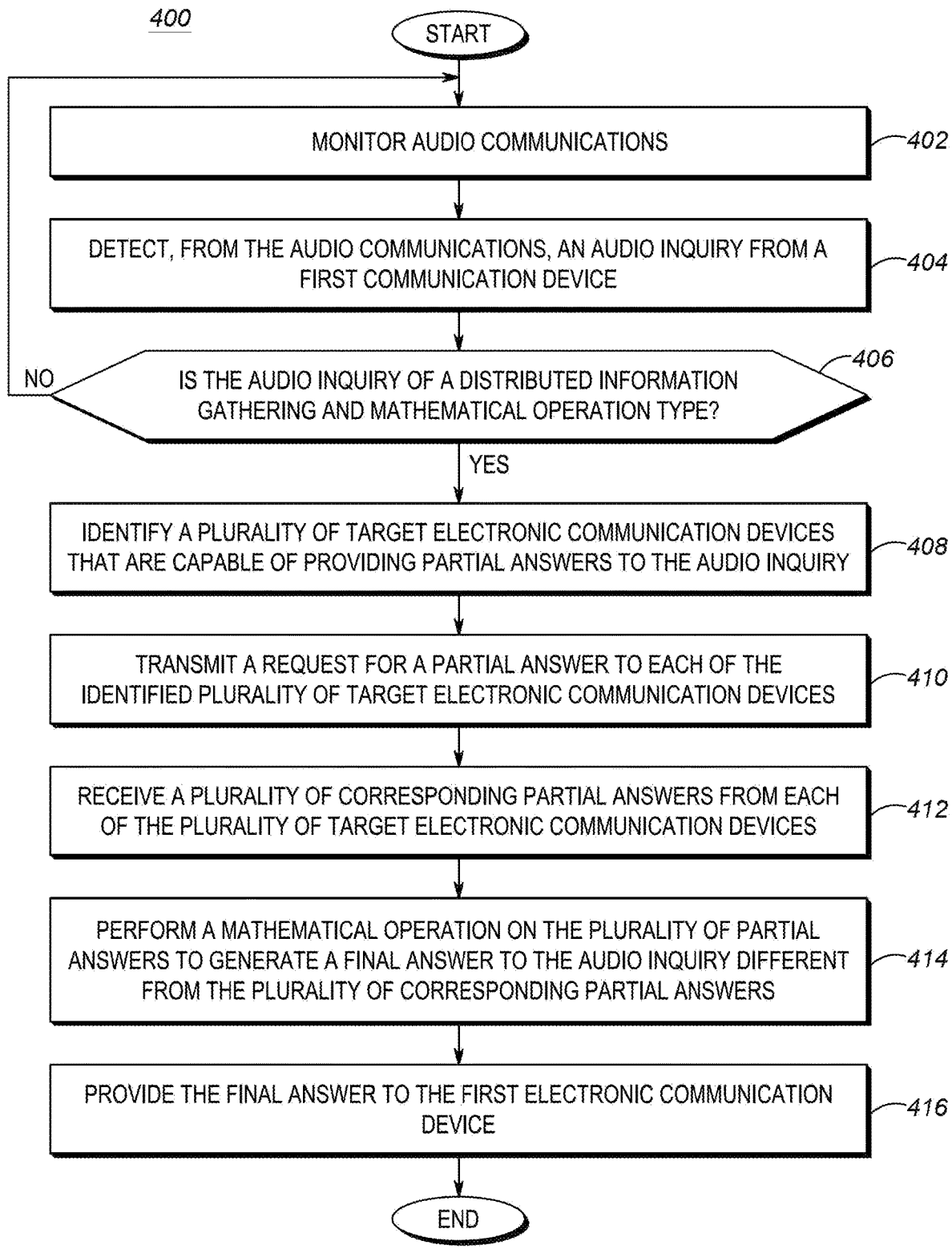
FIG. 4 illustrates a flow chart of a method for an electronic digital assistant recognizing and responding to an audio inquiry by gathering information distributed amongst users and providing a result in accordance with some embodiments.

FIG. 4 illustrates a flow chart diagram of the process 400 performed by the electronic computing device for an electronic digital assistant recognizing and responding to an audio inquiry by gathering information distributed amongst users and providing a calculated result. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At step 402, the electronic computing device monitors audio communications for audio inquiries. The audio communications monitored at step 402 may be communications received at the electronic computing device directly via a transducer/microphone input, may be audio communications transmitted between a plurality of communication devices on a group communication channel (such as between group member communication devices 200A-200C of FIG. 2) where the plurality of communication devices are members of a communication group associated with the group communication channel, or may audio communications transmitted between two electronic devices where a first device is the originating device that directly captures the audio communications from a user and the second device is a target device that receives the audio communications transmitted to it (via one or more wired and/or wireless networks) by the first (e.g., where the second device may be associated with a user or dispatcher may be a device dedicated to provided electronic digital assistant services).

As set forth earlier, in the case of a group communication channel, the group communication channel may be a conventional or trunked LMR channel, or may be an LTE channel over which an OMA-POC session is established, among other possibilities. The group audio communications monitored may be bi-directional group communications between two or more members of the group, and/or may be unidirectional transmissions from a single member of the group to one or more other members of the group. Other possibilities exist as well. The electronic computing device may monitor the audio communications over the group communication channel in a number of different ways. In accordance with some embodiments, the electronic computing device implementing the electronic digital assistant may be added to the communication group as another group member that monitors all audio communications transmitted between members of the communication group on the group communication channel. Additionally or alternatively, a PTT server that controls the group communications may forward the audio communications transmitted on the group call to the electronic computing device to allow the electronic computing device to monitor the audio communications in the communication group.

In still other group communications embodiments, the electronic computing device (implementing the electronic digital assistant) may be locally implemented at each communication device 200 to monitor the audio communications received at a microphone 220 of the communication device 200, for example, prior to the voice inquiry being processed and transmitted as audio communications on the group communication channel associated with the communication device 200, and/or to monitor the audio communications received at a wireless transceiver 208 of the communication device 200 as audio communications on the group communication channel associated with the communication device 200, for example, prior to the audio communications being played back at a speaker 222 of the communication device 200.

Additionally or alternatively, at step 402, the electronic computing device may monitor private call channels (e.g., 1:1 calls) between two communication devices. Private call channels may be established via a conventional or trunked LMR channel assigned or reserved for private calls, or over an LTE channel established for the private call. The electronic computing device may monitor the audio communications over the private call channels in a number of same or similar ways as set forth above with respect to the group communication channel.

For example, and with respect to FIG. 2, the electronic computing device may monitor private audio or multimedia calls, unicast data communications, group audio or multimedia calls, or multicast or broadcast data communications received from one or more of communication devices 200A, 200B, or 200C located at various different locations 210A, 210B, 210C.

At step 404, the electronic computing device detects, from the audio communications monitored at step 402, an audio inquiry from a first communication device (e.g., communication device 200A of FIG. 2). As used herein, the term "audio inquiry" indicates an inquiry from a user (whether explicit or implicit) requiring or allowing for a supplementary or responsive electronically generated response from the electronic digital assistant.

In some embodiments, the audio inquiry may be preceded by a nonce word such as "hey VP," "hey Virtual Partner", or some other mechanism that may be similar in practice to known nonce terms such as "hey Siri™" or "hey Google™". The nonce term may be used by the electronic computing device to more easily discern what parts of the audio communications monitored at step 402 should be acted upon and used to source partial answers and generate final answers at subsequent steps. In other embodiments, no nonce term may be used and/or detected, and instead, the electronic computing device may monitor all audio communications for explicit and/or implicit opportunities to provide additional, responsive, or supportive information to speech content identified in the monitored audio communications using a natural language parser and/or a keyword detector or keyword parsing engine.

The audio inquiry detected at step 404 may be, for example, a request for a single piece of information or an amalgamation of information retrievable from a single database or source such as a request for weather forecast information for a particular location or time, an identity of an officer assigned to a particular incident, or a registered owner or owners of a particular vehicle.

Alternatively, the inquiry may be of a real-time distributed information gathering and mathematical operation type in which information must be retrieved in real-time from a plurality of target electronic communication devices (perhaps including or limited to in-field electronic communication devices, and perhaps some additional information gathering step required at each target electronic communication device), a mathematical operation performed on the received information, and a final answer generated different from the received information and provided back to the requestor. An example of the latter type of inquiry includes a request for a total number of witnesses, victims, or suspects at an incident scene or across a plurality of distinct incident scenes in which a plurality of officers' electronic communication devices must be sourced to aggregate the most up-to-date real-time information. As another example, the inquiry may be whether each of a plurality of officers at a particular incident scene or firefighters at a particular incident scene are ready to enter a building or proceed with a particular planned mission or task. As still another example, the request may be for a maximum or minimum measured temperature across various locations of an incident scene, such as a fire, at which first responders and their associated electronic communication devices are present. As yet another example, the inquiry may be for an identification of all equipment available at a scene (in general or relative to particular task). Other types of audio inquiries could be detected as well.

The electronic computing device may also use additional information such as information obtained from data received from sensor devices and/or other types of information such as the inquiring user's (and/or other communication group member's) current incident assignment, role, other communication groups, channel scan lists, historical queries/actions, and the like to detect an audio inquiry from the first communication device.

At step 406, the electronic computing device further processes the audio inquiry and determines whether the audio inquiry is of a real-time distributed information gathering and mathematical operation type, i.e., a type in which information must be sourced in real-time from a plurality of electronic communication devices, a mathematical operation performed on received partial answer information, and a final answer generated different from the received partial answer information and provided back to the requestor, among possibly others.

In order to determine if the audio inquiry is of a real-time distributed information gathering and mathematical operation type, the electronic computing device may maintain a mapping of keywords and/or intents that identify particular keyword combination and/or intent as associated with inquiries of a real-time distributed information gathering and mathematical operation type.

In accordance with some embodiments, the electronic computing device analyzes the audio inquiry using an NLP engine to obtain the intent of the audio inquiry (and/or using a keyword parsing method or any other method) and determines that a type of the inquiry is a real-time distributed information gathering and mathematical operation type. For example, a real-time distributed information gathering and mathematical operation type inquiry mapping may be stored at the electronic computing device (or at the infrastructure controller 156, the cloud computing cluster 162, or the database 164 of FIG. 1 and made accessible to the electronic computing device) that indicates, for any particular audio inquiry, whether the intent of the audio inquiry is known to require real-time distributed information gathering and mathematical operation(s). An example real-time distributed information gathering and mathematical operation type inquiry mapping is set forth in Table I below.

TABLE I

Example Real-Time Distributed Information Gathering and Mathematical Operation Audio Inquiry Type Mapping

| Audio Inquiry | Is of Real-Time Distributed Information Gathering and Mathematical Operation Type? |
|---|---|
| Intent: "Geographic Directions" | No |
| Intent: "Identify Number of Injured" | Yes |
| Keywords: "Task", "Assignment", "Lookup" | No |
| Keywords: "Ready", "Proceed", "Task" | Yes |

As set forth in Table I, some types of audio inquiries from the monitored communications may be associated with an inquiry that is not of the real-time distributed information gathering and mathematical operation type. For example, a detected NLP intent of obtaining "geographic directions" can generally be answered via a single (cartographic) database look-up using origination and intended destination information. As another example, detected keywords "task," "assignment," and "lookup" may reflect an inquiry by a user of his or her currently assigned task and can generally be answered via a single (CAD data) database look-up using an identifier associated with the requesting user. Detection of an inquiry that is not of the real-time distributed information gathering and mathematical operation type consistent with the real-time distributed information gathering and mathematical operation audio inquiry type mapping results in processing returning to step 402 and additional audio communications being monitored.

As set forth in Table I, some other types of audio inquiries from the monitored communications may be associated with an inquiry that is of the real-time distributed information gathering and mathematical operation type. For example, a detected NLP intent of identifying a number of injured victims at an incident scene will require a real-time information gathering via on-scene (i.e., in-field) first responders (and their associated electronic communication devices) and a mathematical operation on received partial answers to generate an answer different from the partial answers that accurately responds to the audio inquiry with a real-time, up-to-date answer. As another example, detected keywords "ready," "proceed," and "task" may reflect an inquiry by a user of whether a plurality of team members at an incident or operations scene are ready to begin a coordinated task and will require a real-time information gathering via on-scene first responders (and their associated electronic communication devices) and a mathematical operation on received partial answers to generate an answer different from the partial answers that accurately responds to the audio inquiry with a real-time, up-to-date answer.

Detection of an inquiry that is of the real-time distributed information gathering and mathematical operation type consistent with the real-time distributed information gathering and mathematical operation audio inquiry type mapping results in processing proceeding to step 408.

At step 408, the electronic computing device identifies a plurality of target electronic communication devices that are capable of providing partial answers to the audio inquiry. The electronic computing device may identify the plurality of target electronic communication devices that are capable of providing partial answers to the audio inquiry in a number of ways.

For example, identifying the plurality of target electronic communication devices may include identifying all other members of a communication group over which the audio inquiry was detected or to which the first communication device that generated the inquiry is a member. As one example, and with respect to FIG. 2, communication device 200A may generate an audio inquiry such as "how many people in red hats and blue shirts are in this area?" and transmit the audio inquiry to the talkgroup 250. The electronic computing device may receive the inquiry, determine that it is a real-time distributed information gathering and mathematical operation type audio inquiry, and then may identify all other members of talkgroup 250 as target electronic communication devices (i.e., communication devices 200B and 200C in this example). The talkgroup 250 in this case may be based on job duty, location, jurisdiction, in-field status, or some other metric. In some cases, the mapping set forth above may also identify a default target talkgroup or set of target electronic communication devices that may vary for different particular real-time distributed information gathering and mathematical operation type audio inquiries identified at steps 404 and 406.

As another example, identifying the plurality of target electronic communication devices may include identifying all target electronic communication devices within a threshold distance from the first communication device. Using the same example above with respect to FIG. 2, communication devices 200B and 200C may be identified as target electronic communication devices for being within a threshold distance of 10', 100', 500', or 1 mile of the first communication device. Other distance thresholds are possible as well, including but not limited to within an identified incident geofence, within an identified building geofence, or within an identified city, county, township, or state geofence. In some instances, the mapping set forth above may also identify a default threshold distance that may vary for different particular real-time distributed information gathering and mathematical operation type audio inquiries identified at step 406.

The location of each communication device (whether in a same talkgroup or not) may be provided to the electronic computing device by each respective communication device. For example, each communication device may independently determine its location, such as its own longitude/latitude coordinates determined via a GNSS system such as the GPS, or its own Cartesian or polar coordinates determined via a triangulation process via known locations of base stations or other wireless transmitters. Additionally or alternatively, locations for each communication device may be determined by the wireless communication network and provided to the electronic computing device, such as via a network-initiated triangulation process on wireless signals transmitted by a respective communication device and received at a plurality of known base station or other wireless access point locations. The determined location of each communication device may be electronically stored at the electronic computing device accompanying an identifier uniquely identifying the respective communication device in the group.

Additionally or alternatively, target electronic communication devices may be identified via incident context or workflow information. For example, a type of incident assigned to a responder (that initiated the request or that is identified in the audio communications) or talkgroup (over which the request was transmitted or to which the requestor is subscribed) and stored in a CAD database, perhaps at dispatch console 158 or cloud computer cluster 162, may be accessed and processed to determine target electronic communication devices currently associated with the incident. Similarly, shift logs, assigned equipment, jurisdictional information, in-incident status information and/or updates, and other stored workflow information stored in same or similar electronic databases may be accessed and analyzed to determine target electronic communication devices.

Still further, and in addition or as an alternative to the foregoing, target electronic communication devices may be identified based on a content of the audio communications, including the audio inquiry itself and surrounding context of the audio inquiry. For example, a particular first responder or other user identified in the audio communications may be located in a user to device mapping database, and a current target electronic communication device assigned to that user (or responder) may be added as a target electronic communication device. As another example, a particular incident, address, jurisdiction, or first responder agency mentioned in the audio inquiry itself or surrounding context of the audio inquiry, may electronic communication devices stored as associated with the particular incident, address, jurisdiction, or first responder agency to be added as target electronic communication devices at step 408. Other possibilities exist as well.

Next, at step 410, the electronic computing device transmits a request for a partial answer to each of the identified plurality of target electronic communication devices. The request is generated as a function of the audio inquiry, and seeks real-time and up-to-date partial answer information from each target electronic communication device that can subsequently be processed via a mathematical operation to generate a final answer that is different from the plurality of corresponding partial answers.

Continuing with the example set forth above with respect to FIG. 2 in which the audio inquiry "how many people in red hats and blue shirts are in this area?" was detected from communication device 200A, the electronic communication device may responsively identify communication devices 200B and 200C (perhaps among other devices not illustrated in FIG. 2) and transmit requests to communication devices 200B and 200C that similarly requests "how many people in red hats and blue shirts do you see?" and that seeks localized partial answers based on each user's localized current field of view.

Next, at step 412, the electronic computing device receives responses (partial answers) to the previously transmitted request from the identified plurality of target electronic communication devices. The response may be automatically generated at each target electronic communication device in those instances in which an electronic digital assistant operating at each target electronic communication device is capable of independently and automatically determining a local partial answer, and the response automatically provided back to the electronic computing device. In other embodiments, the response may be generated manually at each target electronic communication device in response to each target electronic communication device prompting a user of the corresponding target electronic communication device to provide an answer to the request. In some embodiments, some further information gathering action must be taken by each target electronic communication device to gather the partial answer information requested at each target electronic communication device (e.g., via some automated edge electronic digital assistant action such as retrieving a temperature from a PAN-connected sensor, requesting a temperature input from a user, or performing some video analytics on current or past captured video) while in other embodiments, the requested data may already have been retrieved and stored in local electronic storage at each target electronic communication device and no further action beyond retrieving from local electronic storage is required at each target electronic communication device (such as a periodically sampled and stored temperature from a PAN-connected temperature sensor, or continuously executing video analytics that store metadata of detected objects).

Continuing with the example set forth above with respect to FIG. 2 in which the audio inquiry "how many people in red hats and blue shirts are in this area?" was detected from communication device 200A, each of the target electronic communication devices 200B and 200C may include a local electronic digital assistant than can review current and/or past captured body camera footage for a threshold period of time into the past and determine, via edge-based video analytics operating at each target electronic communication device, how many people in red hats and blue shirts are detected in the captured video. Alternatively, where the target electronic communication devices 200B and 200C do not include a local electronic digital assistant, each target electronic communication devices 200B and 200C may prompt a user to answer an electronically displayed (or auditorally played-back among other options) request to provide an indication of how many people in red hats and blue shirts the user sees and/or saw. The manually entered answer (e.g., via a user interface such as a touch screen or keypad or via a voice interface) may then be provided back to the electronic computing device as a localized partial answer.

In some embodiments, the electronic computing device may, prior to step 414, further sub-select or filter the identified plurality of target electronic communication devices at step 408 or the received plurality of corresponding partial answers at step 412 in order to avoid duplication of localized partial answers.

More specifically, and in one embodiment, the electronic computing device may, at step 408, use additional contextual information such as location and/or field of view information to refrain from identifying those target electronic communication devices that would provide duplicative data via their partial answers.

Continuing with the example set forth above with respect to FIG. 2 in which the audio inquiry "how many people in red hats and blue shirts are in this area?" was detected from communication device 200A, and assuming that the electronic computing device has already received location information to identify locations of communication devices 200A, 200B, and 200C, the electronic computing device may apply some threshold location-dependent limitation, with or without information regarding topography, obstructions, etc., to ensure that duplicate counts are not received in partial answers from target communication device located near one another. In the example of FIG. 2, and using only location information, the electronic computing device may determine that communication devices 200B and 200C are located within a threshold distance of one another (such as 50', 100', or 1 mile) and only identify one of the communication devices 200B and 200C, such as device 200B (among other devices not shown) at step 408 as target electronic communication devices. In other embodiments where location and field of view (orientation) information 212A, 212B, 212C is captured and reported to the electronic computing device for each of the communication devices, the electronic computing device may use both location and field of view information to determine whether overlapping fields of view are present within a threshold distance of one another, and may then refrain from identifying those communication devices that have overlapping fields of view in order to eliminate duplicative information in partial answers. For example, communication devices 200B and 200C have overlapping fields of views 212B and 212C and are within a threshold distance of one another, and as a result, the electronic computing device may only identify one of the communication devices 200B and 200C, such as device 200B (among other devices not shown), at step 408 as target electronic communication devices.

In other embodiments, the electronic computing device may instead, at step 412, use additional contextual information such as location and/or field of view information (perhaps transmitted accompanying, or prior or subsequent to, the partial answers at step 412) to identify and filter out partial answers received from those target electronic communication devices that would provide duplicative data in much the same way as set forth above with respect to step 408, except at step 412 the received duplicative partial answers are simply dropped or ignored instead of refraining from identifying devices as was possible at step 408.

Next, at step 414, the electronic computing device performs a mathematical operation on the plurality of partial answers to generate a final answer to the audio inquiry different from the plurality of corresponding partial answers (as a set). Any number of different mathematical operations may be performed across the set of received partial answers, including but not limited an arithmetic, logical, and/or statistical operation.

Where the mathematical operation is an arithmetic operation, the audio inquiry may be a request for a sum of partial answer values across the plurality of target electronic communication devices. As one example, the audio inquiry may be for a sum of a number of witnesses, victims, or suspects located at an incident scene.

Continuing with the example set forth above with respect to FIG. 2 in which the audio inquiry "how many people in red hats and blue shirts are in this area?" is detected from communication device 200A, and assuming that the electronic computing device has already received partial answers from each of communication devices 200B and 200C, the mathematical operation may be a summation of the numeric partial responses received from each of communication devices 200B and 200C. Assuming that communication device 200B reports seeing (either via video edge analytics or via a number entered into a prompt via a physical interface, a voice interface, or some other interface) one person 262 within its field of view having a red hat and a blue shirt and that communication device 200C reports seeing (again, either via video edge analytics or via a number entered into a prompt via a physical interface, a voice interface, or some other interface) one person 264 within its field of view having a red hat and a blue shirt, the summation mathematical operation may then generate a final answer to the audio inquiry of two, which is different from the plurality of corresponding partial answers (as a set of two partial answers having a value of one). Other types of arithmetic operations, such as subtraction, multiplication, division, or others could be used as well.

Where the mathematical operation is a logical operation, the audio inquiry may be a request for a logical operation to be applied across partial answers from the plurality of target electronic communication devices. As one example, the audio inquiry may be a request of whether all officers at an incident are ready to proceed with a planned mission or task.

As one example with respect to FIG. 2 in which an audio inquiry "is everyone ready to enter the target building?" is detected from communication device 200A, and assuming that the electronic computing device has already received partial answers from each of communication devices 200B and 200C, the mathematical operation may be a logical operation applied to the partial answer responses received from each of communication devices 200B and 200C. Assuming that communication device 200B reports that it is ready to enter the target building (either determined via video edge analytics or via a response entered into a prompt via a physical interface, a voice interface, or some other interface and perhaps represented via alphanumeric text "yes" or a logical symbol equivalent to a yes such as a numeric "1"), and that communication device 200C reports that it is ready to enter the target building as well (again, either determined via video edge analytics or via a response entered into a prompt via a physical interface, a voice interface, or some other interface and perhaps represented via alphanumeric text "yes" or a logical symbol equivalent to a yes such as a numeric "1"), the logical mathematical operation may be an "and" of each partial answer to generate a final answer to the audio inquiry of "yes" or "1", which is different from the plurality of corresponding partial answers (as a set of partial answers). Other types of logical operations, such as or, nand, nor, xor, or others could be used as well.

Where the mathematical operation is a statistical operation, the audio inquiry may be a request for a statistical operation to be applied across partial answers from the plurality of target electronic communication devices. As one example, the audio inquiry may be a request for a maximum temperature being experienced across plurality of officers at varying incident locations.

As one example with respect to FIG. 2 in which an audio inquiry "what is the highest temperature everyone is seeing?" is detected from communication device 200A, and assuming that the electronic computing device has already received partial answers from each of communication devices 200B and 200C, the mathematical operation may be a statistical operation applied to the partial answer responses received from each of communication devices 200B and 200C. Assuming that communication device 200B reports that it is experiencing a temperature of 85° F. (either determined via a temperature sensor at the device and retrieved or provided via a local virtual partner service or determined via a manual response entered into a prompt via a physical interface, a voice interface, or some other interface and perhaps represented via alphanumeric text "85" on the Fahrenheit scale or via some other numeric representation), and that communication device 200C reports that it is experiencing a temperature of 80° F. (either determined via a temperature sensor at the device and retrieved or provided via a local virtual partner service or determined via a manual response entered into a prompt via a physical interface, a voice interface, or some other interface and perhaps represented via alphanumeric text "80" on the Fahrenheit scale or via some other numeric representation), the statistical mathematical operation may be a maximum applied to all partial answers to generate a final numeric answer to the audio inquiry of "85", which is different from the plurality of corresponding partial answers (as a set of partial answers). Other types of statistical operations, such as minimum, average, median, standard deviation, range, or others could be used as well.

In some embodiments, the particular mathematical operation to perform for a particular audio inquiry of a distributed information gathering and mathematical operation type may be stored in the same real-time distributed information gathering and mathematical operation type inquiry mapping stored at the electronic computing device (or at the infrastructure controller 156, the cloud computing cluster 162, or the database 164 of FIG. 1 and made accessible to the electronic computing device) that indicates, for any particular audio inquiry, whether that type of audio inquiry is known to require real-time distributed information gathering and mathematical operation(s). An example modified real-time distributed information gathering and mathematical operation type inquiry mapping is set forth in Table II below.

TABLE II

Example Modified Real-Time Distributed Information Gathering and Mathematical Operation Audio Inquiry Type Mapping

| Audio Inquiry | Is of Real-Time Distributed Information Gathering and Mathematical Operation Type? | Particular Mathematical Operation to Perform |
|---|---|---|
| Intent: "Geographic Directions" | No | NULL |
| Intent: "Identify Number of Injured" | Yes | Arithmetic Sum |
| Keywords: "Task", "Assignment", "Lookup" | No | NULL |
| Keywords: "Ready", "Proceed", "Task" | Yes | Logical And |

As set forth in Table II, a detected NLP intent of identifying a number of injured victims at an incident scene will require a real-time information gathering via on-scene first responders (and their associated electronic communication devices) and a mathematical operation of an arithmetic sum (as shown above) on the received partial answers to generate a final answer different from the partial answers that accurately responds to the audio inquiry with a real-time, up-to-date answer. As another example, detected keywords "ready," "proceed," and "task" may reflect an inquiry by a user of whether a plurality of team members at an incident or operations scene are ready to begin a coordinated task and will require a real-time information gathering via on-scene first responders (and their associated electronic communication devices) and a mathematical operation of a logical and (as shown above) on received partial answers to generate a final answer different from the partial answers that accurately responds to the audio inquiry with a real-time, up-to-date answer. Other ways of identifying a particular mathematical operation are possible as well, and mappings between keywords and/or intents and associated mathematical operations to be performed on retrieved partial answers may be stored elsewhere in separate mappings, in relational databases, or in other sources.

Of course, the electronic computing device may also use additional information such as information obtained from data received from sensor devices and/or other type of information such as the inquiring user's (and/or other communication group member's) current incident assignment, role, other communication groups, channel scan lists, historical queries/actions, and the like in generating the final answer. Other possibilities exist as well.

The generated response may be in the form of an alphanumeric response as noted above (e.g., such as "yes" or "85") that may be delivered to the first electronic communication device (among other electronic communication devices including the target electronic communication devices) in text form for local display or audio-to-text playback, or may be in a generated multimedia response form (e.g., including images, audio, and/or video) that may be delivered to the first electronic communication device (among other electronic communication devices including the target electronic communication devices) in a streaming form or downloadable form for local playback.

Next, at step 416, the electronic computing device causes the generated final answer to the audio inquiry to be provided to the first communication device (among other electronic communication devices including the target electronic communication devices) individually via a private call, unicast data connection, group call, or multicast or broadcast data connection, among other possibilities. As one example, a text-based generated final answer may be provided to the first communication device via a unicast data connection (and which may include e-mail, text, or instant message), or to the first communication device and other communication devices (perhaps including the target electronic communication devices) via a multicast or broadcast data connection (which again may include e-mail, text, or instant message). Image, video, or audio-based final answers may be similarly provided to the first communication device via a unicast data connection, or to the first communication device and other communication devices (perhaps including the target electronic communication devices) via a multicast or broadcast data connection.

In other embodiments, an audio or text-based final answer may be provided to the first communication device via a private (audio) narrowband or broadband call (e.g., played back over the established private call perhaps using a text-to-audio conversion module) or to the first communication device and other communication devices via a group (audio) narrowband or broadband call (e.g., played back over the established private call perhaps using a text-to-audio conversion module). In still other embodiments, image, video, or audio-based final answers may be provided to the first communication device via a private (multimedia) call (e.g., streamed over the established private call) or to the first communication device and other communication devices via a group (multimedia) call (e.g., streamed over the established group call).

The unicast, multicast, and/or broadcast data connections and the private and/or group calls may be established via communication channels using any one of the protocols set forth earlier, and in some embodiments, may be already established with each communication device, may be reserved for such use and assigned upon request by the electronic computing device, or may be established and assigned only after request by the electronic computing device. If not already established, the electronic computing device may cause a request to be transmitted to establish each communication channel to a network system controller such as a network call controller, PTT server, zone controller, MME, BSC, MSC, site controller, Push-to-Talk controller, or other network controlling device, which may be fully or partially implemented at infrastructure controller 156 or in cloud computing cluster 162 of FIG. 1, among other possibilities.

CONCLUSION

In accordance with embodiments of the disclosure, system and methods described herein can be advantageously employed in public safety environments to more intelligently and effectively respond to audio inquiries requiring gathering of information distributed amongst users in real-time and providing a calculated result by, for example, synthesizing the information to generate the calculated result that is different from the set of all information gathered from the users, and providing the result in accordance with various embodiments. This addresses existing problems in the field of electronic digital assistants in which such assistants could not electronically distinguish between those audio inquiries requiring a database lookup to retrieve individual pieces of information, and those audio inquiries requiring distributed information gathering from in-field users and their communications devices and mathematical operations to generate a final answer different from received individual partial answers. As a result, electronic digital assistants can access stored mappings and recognize those audio inquiries requiring distributed information gathering from in-field users and their communication devices, identify which target communication devices can provide partial answers relative to the audio inquiry, retrieve partial answers from the identified target communication devices, perform a particular associated mathematical operation on the received partial answers relative to the audio inquiry to generate a final answer, and provide the final answer back to the requesting device, among other possible devices that allows the requesting communication device and associated user to take further action in light of up-do-date and real-time information quickly and automatically aggregated across multiple user communication devices and their locations, allowing the requesting officer to make such complex inquiries via a hands-down, eyes up audio interface, and still receive complex answers to audio inquiries requiring distributed information gathering and processing not available via conventional electronic digital assistants. Other benefits and advantages are possible as well.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for an electronic digital assistant recognizing and responding to a detected audio inquiry by gathering information distributed amongst users and providing a calculated result, the method comprising:
    monitoring, at an electronic computing device, audio communications;
    detecting, at the electronic computing device, from the audio communications, an audio inquiry from a first electronic communication device;
    determining, by the electronic computing device, that the audio inquiry is of a distributed information gathering and mathematical operation type and responsively:
        identifying, by the electronic computing device, a plurality of target electronic communication devices that are capable of providing partial answers to the audio inquiry;
        transmitting, by the electronic computing device, a request for a partial answer to each of the identified plurality of target electronic communication devices;
        receiving, by the electronic computing device, a plurality of corresponding partial answers from the plurality of target electronic communication devices, wherein each of the plurality of corresponding partial answers are a function of manually entered answers received at the plurality of target electronic communication devices in response to the request for the partial answer;
        performing, by the electronic computing device, a mathematical operation on the plurality of corresponding partial answers to generate a final answer to the audio inquiry different from the plurality of corresponding partial answers; and
        providing, by the electronic computing device, the final answer to the first electronic communication device.

2. The method of claim 1, wherein determining that the audio inquiry is of a distributed information gathering and mathematical operation type includes detecting one or more keywords in the audio communications that map, via a stored distributed information gathering mapping, to a particular distributed information gathering query included in the mapping.

3. The method of claim 1, wherein determining that the audio inquiry is of a distributed information gathering and mathematical operation type includes applying a natural language parser to the audio communications and receiving an indication of intent, from the natural language parser, that maps, via a stored distributed information gathering mapping, to a particular distributed information gathering query included in the mapping.

4. The method of claim 1, wherein the mathematical operation is one of an arithmetic, logical, and statistical operation.

5. The method of claim 4, wherein the mathematical operation is an arithmetic operation, and the audio inquiry is a request for a sum of a value across the plurality of target electronic communication devices.

6. The method of claim 5, wherein the request is for a sum of a number of witnesses, victims, or suspects located at an incident scene.

7. The method of claim 4, wherein the mathematical operation is a logical operation, and the audio inquiry a request for a logical OR or a logical AND of values across the plurality of target electronic communication devices.

8. The method of claim 7, wherein the request is whether all officers at an incident are ready to proceed with a planned mission or task.

9. The method of claim 4, wherein the mathematical operation is a statistical operation, and the audio inquiry is a request for an average, median, maximum, or minimum value across the plurality of target electronic communication devices.

10. The method of claim 9, wherein the request is for a maximum temperature at an incident scene.

11. The method of claim 1, wherein identifying the plurality of target electronic communication devices comprises identifying all other members of a communication group over which the audio inquiry was detected.

12. The method of claim 1, wherein identifying the plurality of target electronic communication devices comprises identifying a location component of the audio inquiry, and identifying all known electronic computing devices within a threshold distance of the location component.

13. The method of claim 12, wherein the location component is an identified GPS location, an identified incident, an identified building, or an identified city, county, township, or state.

14. The method of claim 1, wherein identifying the plurality of target electronic communication devices comprises identifying those electronic computing devices that are within a threshold distance of one another as a sub-group, and only transmitting the request to one electronic computing device within each sub-group or only including a response received from one electronic computing device within each sub-group in the mathematical operation in order to avoid duplication of data.

15. The method of claim 14, wherein the audio inquiry is a request for a sum of a number of witnesses, victims, or suspects located across a plurality of distinct incident scenes.

16. The method of claim 1, wherein the final answer is an alphanumeric result provided in a form of alphanumeric text or speech.

17. The method of claim 1, further comprising using one or more of location information for each of the plurality of target electronic communication devices, video content information provided by one or more of the plurality of target electronic communication devices, and audio content information provided by one or more of the plurality of target electronic communication devices to identify duplicate information, and removing the identified duplicate information from the plurality of corresponding partial answers prior to performing the mathematical operation.

18. The method of claim 1, further comprising using location information for each of the plurality of target electronic communication devices and video camera field of view information provided by one or more of the plurality of target electronic communication devices to identify duplicate information, and removing the identified duplicate information from the plurality of corresponding partial answers prior to performing the mathematical operation.

19. An electronic computing device for an electronic digital assistant to recognize and respond to a detected audio inquiry by gathering information distributed amongst users and providing a calculated result, the electronic device comprising:
an electronic processor; and
a communication interface communicatively coupled to the electronic processor, wherein the electronic processor is configured to:
monitor, via the communication interface, audio communications;
detect, from the audio communications, an audio inquiry from a first electronic communication device;
determine that the audio inquiry is of a distributed information gathering and mathematical operation type and responsively:
identify a plurality of target electronic communication devices that are capable of providing partial answers to the audio inquiry;
transmit, via the communication interface, a request for a partial answer to each of the identified plurality of target electronic communication devices;
receive, via the communication interface, a plurality of corresponding partial answers from the plurality of target electronic communication devices, wherein each of the plurality of corresponding partial answers are a function of manually entered answers received at the plurality of target electronic communication devices in response to the request for the partial answer;
perform a mathematical operation on the plurality of corresponding partial answers to generate a final answer to the audio inquiry different from the plurality of corresponding partial answers; and
provide, via the communications interface, the final answer to the first electronic communication device.

20. A non-transient computer readable medium containing program instructions for causing a computer to perform a first set of functions comprising:
monitor, via a communication interface, audio communications;
detect, from the audio communications, an audio inquiry from a first electronic communication device;
determine that the audio inquiry is of a distributed information gathering and mathematical operation type and responsively:
identify a plurality of target electronic communication devices that are capable of providing partial answers to the audio inquiry;
transmit, via the communication interface, a request for a partial answer to each of the identified plurality of target electronic communication devices;
receive, via the communication interface, a plurality of corresponding partial answers from the plurality of target electronic communication devices, wherein each of the plurality of corresponding partial answers are a function of manually entered answers received at the plurality of target electronic communication devices in response to the request for the partial answer;
perform a mathematical operation on the plurality of corresponding partial answers to generate a final answer to the audio inquiry different from the plurality of corresponding partial answers; and provide, via the communications interface, the final answer to the first electronic communication device.

* * * * *